(12) United States Patent
Valbonesi (10) Patent No.: US 8,547,904 B2
(45) Date of Patent: Oct. 1, 2013

(54) SUPPORTING COMMUNICATION DEVICES WITH DIFFERENT TECHNOLOGIES WITHIN THE SAME COMMUNICATION CHANNEL

(75) Inventor: Lucia Valbonesi, Arlington Heights, IL (US)

(73) Assignee: Cambium Networks, Ltd, Devon (GB)

( * ) Notice: Subject to any disclaimer, the term of this patent is extended or adjusted under 35 U.S.C. 154(b) by 260 days.

(21) Appl. No.: 12/967,283

(22) Filed: Dec. 14, 2010

(65) Prior Publication Data

US 2012/0147814 A1 Jun. 14, 2012

(51) Int. Cl.
*H04L 12/26* (2006.01)
(52) U.S. Cl.
USPC .......................................... 370/328; 370/474
(58) Field of Classification Search
USPC ........................... 370/328, 465, 466, 467, 331
See application file for complete search history.

(56) References Cited

U.S. PATENT DOCUMENTS

| | | | |
|---|---|---|---|
| 5,732,076 A | 3/1998 | Ketseoglou et al. | |
| 2004/0001429 A1* | 1/2004 | Ma et al. | 370/210 |
| 2010/0046464 A1* | 2/2010 | Kwak et al. | 370/330 |
| 2010/0111005 A1* | 5/2010 | Ahn et al. | 370/329 |
| 2012/0005550 A1* | 1/2012 | Ito | 714/748 |
| 2012/0224659 A1* | 9/2012 | Yu et al. | 375/340 |

* cited by examiner

*Primary Examiner* — Gary Mui
(74) *Attorney, Agent, or Firm* — Brinks Hofer Gilson & Lione (57) ABSTRACT

A method and apparatus for support communication devices with different communication technologies within the same communication channel includes establishing a common frame structure for the communication channel, the frame having a fixed length and having downlink and uplink portions split between different first and second communication technologies. A next step includes providing different control messages for the respective different technologies in the frame. A next step includes decoding downlink data in a downlink subframe of the frame using the different technologies utilizing information in the control messages. A next step includes supplying uplink data in an uplink subframe of the frame using the different technologies utilizing information in the control messages.

17 Claims, 7 Drawing Sheets

SUPPORTING COMMUNICATION DEVICES WITH DIFFERENT TECHNOLOGIES WITHIN THE SAME COMMUNICATION CHANNEL

FIELD OF THE DISCLOSURE

The present invention relates generally to wireless communication networks and more particularly to the support of communication devices with different communication technologies within the same communication channel.

BACKGROUND

In wireless communication applications the need for throughput and capacity keeps increasing over time. Wireless Internet Service Providers (WISPs) who installed their communication networks years ago have a large number of users with hardware running communication technologies that are difficult to upgrade without replacing the hardware. With a business need to increase throughput and capacity in these networks, the migration path to more efficient communication technologies is of great importance. In many cases the option of replacing all the radios in the entire communication network with new hardware is not feasible, because of the cost and the time needed to reach all the subscribers, during which service cannot be provided. In this scenario it is therefore necessary to support both the old and new communication technologies at the same time.

For example, in a wide area network, such as the Motorola Canopy™ communication system, with all radios supporting frequency shift keying (FSK) technology, the need for higher throughput and capacity may require the WISP to switch to the newly developed orthogonal frequency division multiplexing (OFDM) technology. However, it would be necessary to keep supporting the existing FSK subscriber modules, which may or may not be replaced by OFDM units over time. When new units are added to the network, they should support OFDM technology. In addition, any Access Point (AP) supporting FSK technology would need to be replaced by a dual mode FSK-OFDM AP which supports both groups of users.

One solution to this problem is to have two APs that time-multiplex slots from the old and new technologies. However, this solution does not adequately resolve the problem because it requires parameters from one technology to be selected according to the other technology. For example, the slot times need to be integer multiples of each other. In the FSK-OFDM case, this would lead to wasting air time. Also, the ratio between the times spent on either technology cannot be changed frame by frame. Although this solution describes a way for the two access points to communicate to each other and negotiate the number of slots assigned to each one, this negotiation takes several frame times. Although this solution could be acceptable for the technologies which are related to voice communications, in the case of data communications, the demand from one group of users can significantly change from one frame to the next.

Accordingly, there is a need to allow WISPs to upgrade their communication network without having to replace all the communication units at the same time. In particular, it would be of benefit to find a technique to support communication devices with different communication technologies within the same communication channel.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique to support communication devices with different communication technologies within the same communication channel. The present invention allows Wireless Internet Service Providers (WISPs) to upgrade their network without having to replace all subscriber modules at the same time. In particular, the subscriber modules (SMs) with the most amount of traffic can be replaced by new subscriber modules without a need to change the remaining existing users. Over time WISPs can add more new subscriber modules and/or replace old subscriber modules.

The present invention finds specific application in wide area networks, such as Motorola's Canopy™ system as described herein, and can be applied in both the current Frequency Shift Keying (FSK) Time Division Duplex (TDD) platform as well as the newly developed Orthogonal Frequency Division Multiplexing (OFDM) system. However, it should be recognized that the present invention is also applicable to other wireless communication systems modified to implement embodiments of the present invention.

Figure 1:
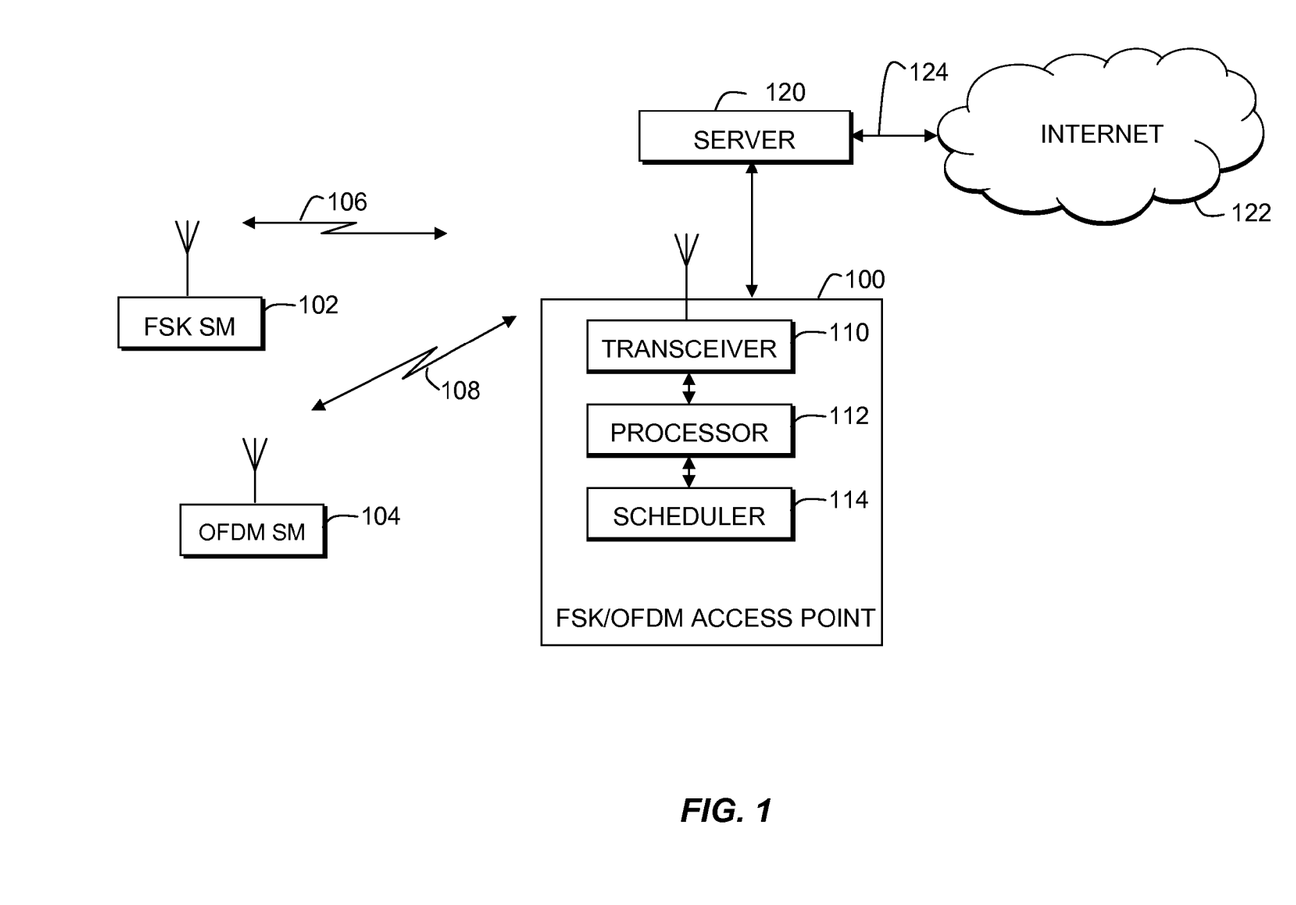
FIG. 1 is a simplified block diagram of a system, in accordance with the present invention.

FIG. 1 is a block diagram depiction of a system in accordance with the present invention. A wide area network, such as the Motorola's Canopy™ system utilizes one or more access points (AP) 100 (one shown) that services a plurality of subscriber modules (SM) 102, 104 within a sector. The AP has been modified to operate in a dual-mode as described herein. The access point 100 functions similarly to a base station and the subscriber module functions similarly to a mobile radiotelephone in a cellular communication system, but it is in a fixed location. Other access points (not shown) service other subscriber modules (also not shown) in other sectors. For example, six access points could be co-located at a single site, with each access point serving a generally sixty-degree area (sector) of a hexagonal region surrounding the site. A server 120 (such as a bandwidth authentication manager) provides an Internet Protocol (IP) pipe connection 124 from the Internet 122 to each access point, as is known in the art, for transferring information with subscriber modules. This connection 124 can be wired or wireless. Each access point 100 includes a wireless physical layer as part of its protocol stack to communicate with its assigned subscriber modules 102, 104. The protocol stack can also include Transport Control Protocol/Internet Protocol (TCP/IP) layers and an application layer to drive communications between the access point 100, server 120, and the subscriber modules. The protocols and messaging needed to establish a wireless communication network are known in the art and will not be presented here for the sake of brevity.

Although FIG. 1 shows a block diagram of various entities adapted to support the inventive concepts of the embodiments of the present invention, those skilled in the art will recognize that FIG. 1 does not depict all of the equipment necessary for network to operate but only those network components and logical entities particularly relevant to the description of embodiments herein. For example, servers, access points, and subscriber modules can all incorporate separate processors, communication interfaces, transceivers, memories, etc. In general, components such as processors, transceivers, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Referring back to FIG. 1, in general operation, when an SM 102, 104 boots up, the SM synchronizes with the AP 100. The AP sends a Registration Request message to the server 120 for authentication. Following a successful challenge, the server 120 returns an Authentication Grant message to the AP, and the AP sends a Registration Grant message to the SM, setting up the IP address of the SM for communicating with the Internet 122. The AP broadcasts in frames that contain control information for downlink (DL) and uplink (UL) communications, such as allocating slots in succeeding or future uplink frames in an uplink map (UL MAP) to SMs that have requested service. Each SM retrieves the UL MAP, and examines a header in downlink data to distinguish whether data is addressed thereto. SMs insert data into the slots of the scheduled uplink in an amount that the AP has established in the UL MAP. Uplink slots also can contain control information from each SM that requests service on succeeding uplink frames.

Figure 2:
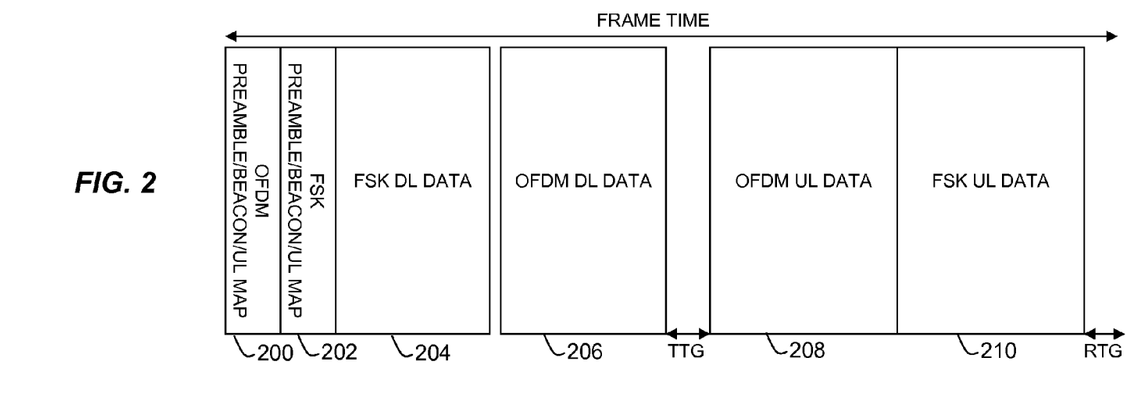
FIG. 2 is a graphical representation of a combination FSK/OFDM communication frame structure, in accordance with the present invention.

In accordance with the present invention, a dual-mode access point 100 is introduced that is operable in both FSK and OFDM modes. The AP 100 includes a transceiver 110, at least one processor 112, and at least one scheduler 114. With this new dual-mode AP 100, the frame length remains the same between the FSK and OFDM technologies, so that the latency in the current FSK system does not change. The amount of DL and/or UL data can be reduced to accommodate a second set of control messages for OFDM in addition to the FSK control messages. Both the DL and UL portions of the frame are split between the FSK and OFDM technologies with a ratio that depends on the amount of traffic, the priority of traffic, and the number of users in each group. The DL/UL ratio of the frame is configurable by the WISP and can be fixed once the network is deployed. However, it is preferred that the ratio of each subframe changes from frame to frame to shift boundaries between the OFDM and FSK portions of the UL and DL subframes, dependent on how many OFDM SMs are added to the network. In accordance with the present invention, neither the FSK SMs nor the OFDM SMs need to detect the presence of, or decode, the other technology. The structure of the new FSK-OFDM frame is shown in FIG. 2.

The timing of the frame starts with a download of control messages 200 sent by the AP processor 112 via the transceiver 110 to the OFDM subscriber modules 104, which includes a preamble, beacon and UL MAP. The length in time of these OFDM control messages is known and does not change frame by frame. Afterwards, the control messages 202 for the FSK subscriber modules 102 are downloaded, which also includes a preamble, beacon and UL MAP. The beginning of the FSK control messages 202 does not shift frame-by-frame because of the fixed length of the preceding OFDM control messages 200. The control messages for each technology appear at the beginning of the frame, first for OFDM and then for FSK. As the start point and length of these control messages 200, 202 is fixed in every frame, the SMs for each technology can: synchronize in time and frequency (with the preamble), receive information about the system (with the beacon), and receive information on the uplink (UL) schedule with the UL MAP.

After the control messages are sent, the FSK DL data 204 is sent by the AP processor 112 via the transceiver 110, which is followed by the OFDM DL data 206, terminating the DL subframe. Between the DL subframe and UL subframe there is a Tx/Rx transition gap (TTG) that allows the AP to switch from transmit to receive mode and SMs to switch from receive to transmit mode. The TTG allows the AP transmitter carrier to ramp down, the transmit/receive (Tx/Rx) antenna switch to actuate, the AP receiver section to activate, and the SM transmitter sections to activate. In addition, there is a gap (in time) between the FSK DL data transmission 204 and the OFDM DL data transmission 206 because the time reserved for the FSK DL portion needs to be an integer number of OFDM symbols in order for the OFDM SM to maintain synchronization. In other words, the time reserved between the beginning of the FSK DL data and the beginning of the OFDM DL data equals an integer number of OFDM symbols.

After the TTG, the UL subframe starts, first with the OFDM UL data 208 portion and then the FSK UL data 210 portion. Between the OFDM UL data 208 and the FSK UL data 210 there is no need for a time gap since the TTG can be adjusted in each system to make sure the symbols can be transmitted back-to-back. Like the DL subframe, the ratio between the UL FSK data and UL OFDM data portions can change frame by frame and it depends on the amount of traffic, the priority of traffic, and the number of users in each group. The UL OFDM/FSK ratio does not need to be the same as the DL OFDM/FSK ratio.

After the UL subframe there is a Rx/Tx transition gap (RTG) that allows time for the AP to switch from receive to transmit mode and the SMs to switch from transmit to receive mode. The RTG allows the AP transmitter carrier to ramp up, the Tx/Rx antenna switch to actuate, the AP receiver section to deactivate, and the SM receiver sections to activate, after which another frame can begin.

Figure 3:
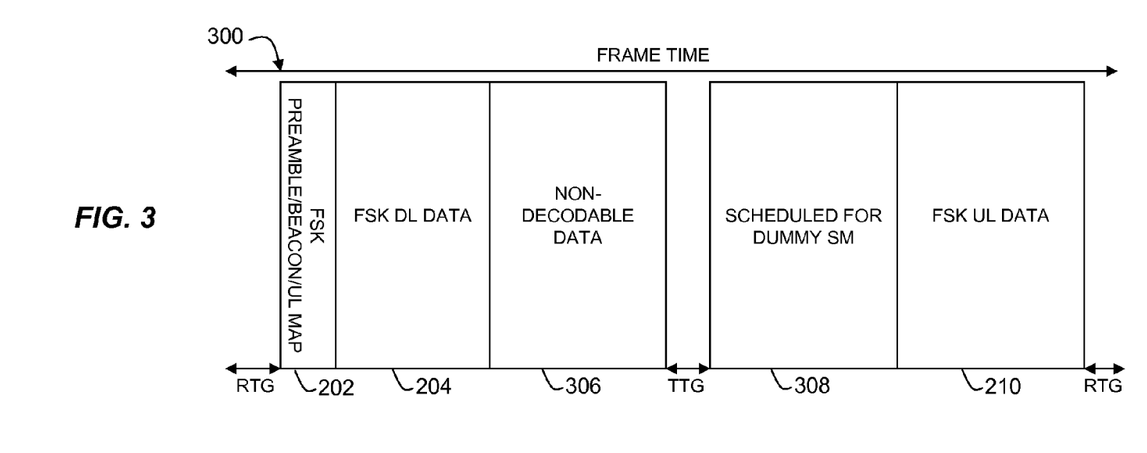
FIG. 3 is a graphical representation of the frame structure of FIG. 2, as utilized by an FSK subscriber module, in accordance with the present invention.

Any FSK subscribers 102 already deployed in the field have no knowledge of the presence of OFDM signals. The frame structure that these FSK subscribers process is shown in FIG. 3. The beginning 300 of the FSK downlink (and of the FSK frame) is shifted in time with respect to the AP frame of FIG. 2, but does not change frame by frame, therefore the FSK subscribers are able to synchronize as before. The information contained in the beacon of the FSK control messages 202 indicates a number of DL slots to fill up the whole DL subframe, including the portion 206 dedicated to the OFDM DL data transmission. After the FSK control messages, the FSK DL data 204 is transmitted, followed by OFDM DL data 206. However, during the OFDM portion 206 of the DL subframe the FSK SM continues to try to decode the DL data, but the Cyclic Redundancy Check (CRC) of the decoding will always fail since the FSK subscriber is not able to read OFDM data. In this way, the FSK SM operates as if the FSK DL is not completely full and is simply followed by noise, which is like non-decodable data 306.

For the UL subframe, the information contained in the beacon of the FSK control messages 202 indicates a number of UL symbols to fill up the whole UL subframe, including the portion dedicated to OFDM UL data 208. The UL MAP indicates to each identified FSK SM when to send their FSK UL data 210. The OFDM data portion 308 of the UL is allocated to a dummy SM in the FSK UL MAP, which the FSK SM will then ignore. Any unscheduled portion of the FSK UL data portion is available to the FSK SMs for contention. However, the FSK SMs will not try to use the OFDM UL slots for contention since those slots were allocated to a dummy SM.

Figure 4:
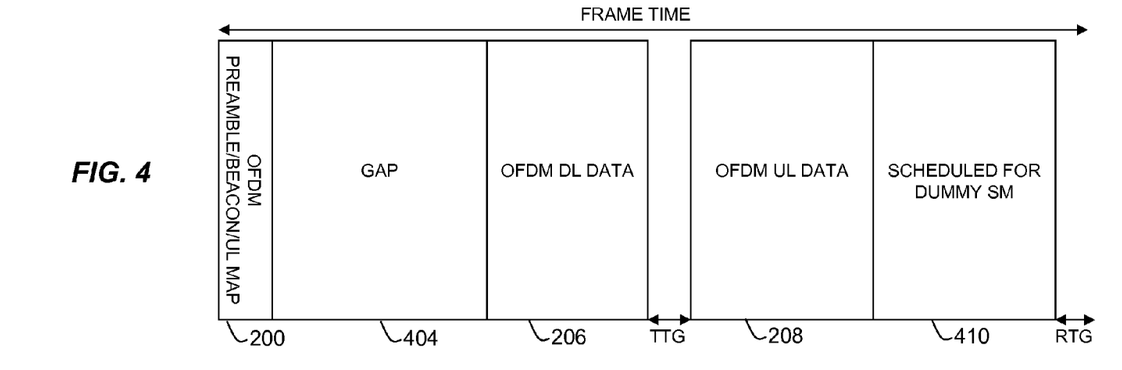
FIG. 4 is a graphical representation of the frame structure of FIG. 2, as utilized by an OFDM subscriber module, in accordance with the present invention.

Any OFDM subscribers 104 do not need to detect the presence of the FSK signal. The frame structure that these OFDM subscribers process is shown in FIG. 4. In the DL, the OFDM SM receives the OFDM control messages 200 including the preamble, beacon and UL MAP. Then there is a gap 404 before the OFDM DL data 206 is transmitted. Since the OFDM receiver relies on pilot signals being transmitted in every symbol to update the channel estimate, information is added to the beacon in order to indicate which DL symbols need to be decoded by the OFDM SM and which DL symbols need to be ignored. There is no need to have a full DL MAP, just one more field is necessary in the beacon indicating how many symbols to skip in the gap 404 before the OFDM DL data 206 is transmitted.

For the uplink subframe, the UL MAP in the OFDM control messages 200 indicates to each OFDM SM when to transmit their data in the OFDM UL data portion 208. The FSK UL portion 410 is allocated to a dummy SM so the OFDM SMs will then ignore and not attempt to use these slots for contention. Although any expected unscheduled symbols at the end of the OFDM UL data portion 206 can be used for contention, the present invention envisions that any unscheduled symbol within the OFDM UL data portion 206 can be used by the OFDM SM for contention. Accordingly, OFDM SMs can be modified, in accordance with the present invention, to use any unscheduled symbol for contention.

The access point 100 needs to support both the FSK and the OFDM technologies. The baseband processing of the packets transmitted in each portion of the frame is completely independent and may require two separate processors 112. The common portion of the processing can be in the scheduler 114. The scheduler needs to know how many users use each technology, in addition to the priority of the messages sent/received by each group of users and the length of the queue for the two groups of users. In one embodiment, two schedulers 114 can run in parallel, one for the FSK portion and the other for the OFDM portion of the frame. The two schedulers negotiate the location of the FSK/OFDM boundary between the FSK and OFDM portions in each subframe depending on the traffic parameters, such as the amount of traffic and the priority of traffic of their users. Once each scheduler knows how many slots it can schedule for one technology, it operates independently. In another embodiment, there is only one scheduler 114 with only one queue of data. The scheduler knows which user is using which technology and knows in which portion of the frame to allocate it by adjusting the FSK/OFDM boundary accordingly. As the scheduler goes through the queue, the scheduler can start allocating FSK symbols from the beginning of each subframe, and OFDM symbols from the end of each subframe, and stop allocating when no symbols are left in between.

Figure 5:
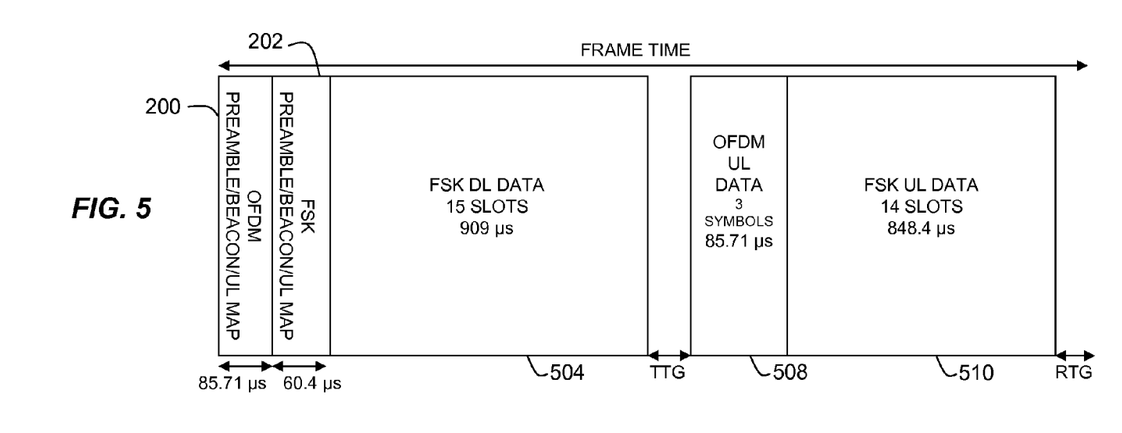
FIG. 5 is a graphical representation of the frame structure of FIG. 2, when one OFDM subscriber module is added, in accordance with the present invention.

OFDM technology is more efficient than the FSK technology, and therefore it is desired to increase the number of OFDM SMs using the network. As detailed above, increasing the proportion of OFDM SMs using the network will result in a shifting of the boundaries between the OFDM and FSK portions of the UL and DL subframes. FIG. 5 demonstrates the example of adding the first OFDM SM to an all FSK network and the change in peak throughput that happens when an FSK-only AP is replaced with the dual-mode AP of the present invention.

It is assumed that at least 316 µs is needed for TTG+RTG, and that an FSK-only frame uses 60.4 µs for control messages 202, one half slot for an ACK (acknowledgement) message (29.4 µs) and two half slots for contention (29.4 µs each). This leaves 33 data slots (33×60.6 µs+60.4 µs+3×29.4 µs=2148.4 µs, leaving 351.6 µs for TTG+RTG). As soon as the first OFDM SM is added to the network, the OFDM system requires at least three symbols for the control messages 200 in the DL and at least three symbols (one for ACK and two for contention) in the UL. This is in addition to any data that the OFDM SM needs to send/receive. Even in the frames in which no data are sent/received by the OFDM SM, the maximum number of FSK slots 504, 510 is now 29, as shown in FIG. 5.

An FSK-only AP has a maximum throughput of 33×64 bytes/2.5 ms×2=13.5 Mbps (assuming 4-level FSK). When the first OFDM SM is added to the network, four FSK slots are lost, and the FSK peak throughput goes down to 29×64 bytes/2.5 ms×2=11.87 Mbps, a 12.1% loss. Note that this loss could be decreased for example by allocating only one OFDM symbol for contention instead of two, because if there is a very small number of OFDM users, the probability of collision in a contention symbol is very small.

Figure 6:
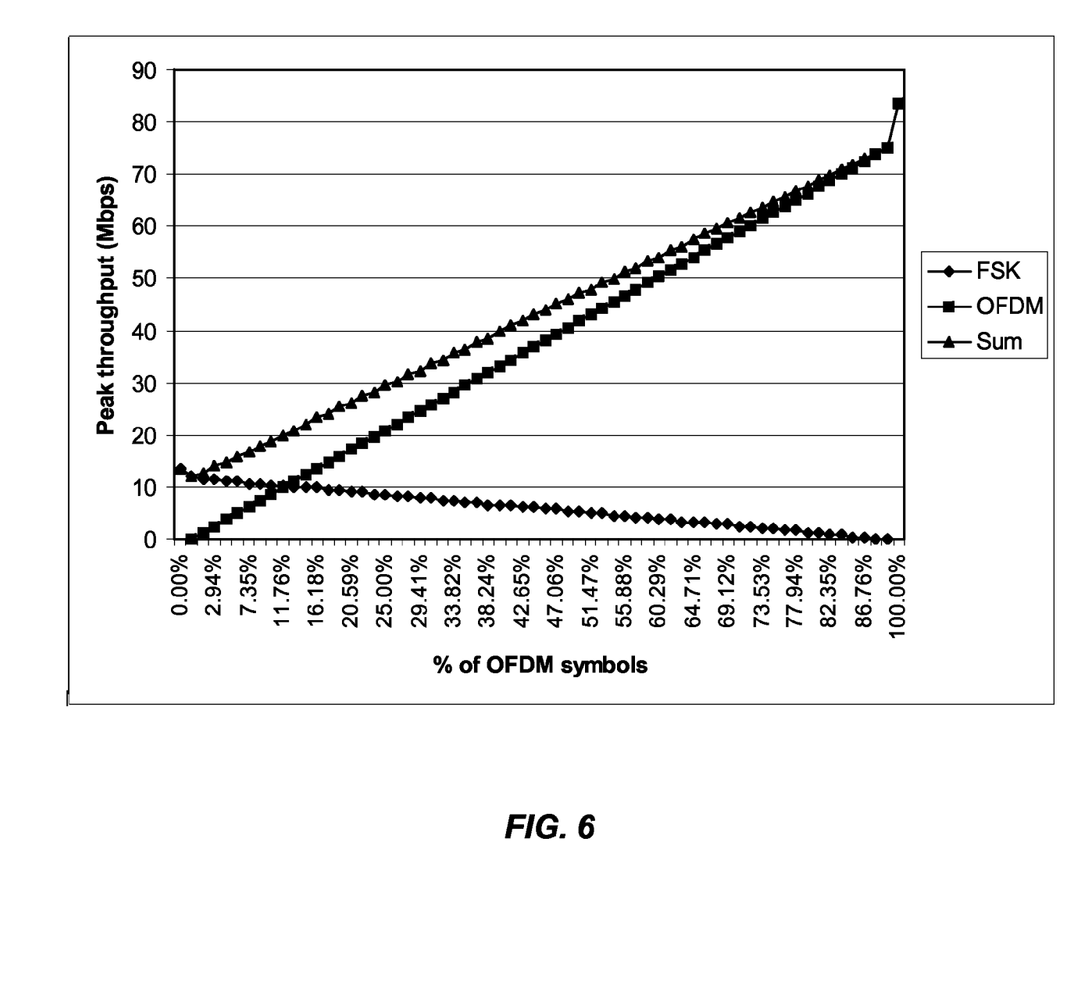
FIG. 6 is a graph representing the calculations of Table 1.

Table 1 and corresponding FIG. 6 show the peak throughput for the FSK and the OFDM subframes as well as the total (sum) throughput of the combination FSK/OFDM system as a function of the percentage of OFDM symbols in the frame. As mentioned above, when the first OFDM SM is added to the system, the FSK throughput drops 12.1%. When more and more FSK SMs are replaced by OFDM SMs and the OFDM portion of the frame increases, the overall throughput increases as well. When the last FSK user is left in the system, even if it is not sending/receiving anything the overall throughput is 10.3% lower than the one for an OFDM-only system.

TABLE 1

4-level FSK + 64QAM MIMO OFDM peak throughput

| Number of symbols | | Throughput (Mbps) | | |
|---|---|---|---|---|
| FSK | OFDM | FSK | OFDM | Sum |
| 33 |   | 13.52 |   | 13.52 |
| 29 | 0 | 11.88 | 0.00 | 11.88 |
| 28 | 1 | 11.47 | 1.23 | 12.70 |
| 28 | 2 | 11.47 | 2.46 | 13.93 |
| 27 | 3 | 11.06 | 3.69 | 14.75 |
| 27 | 4 | 11.06 | 4.92 | 15.97 |
| 26 | 5 | 10.65 | 6.14 | 16.79 |
| 26 | 6 | 10.65 | 7.37 | 18.02 |
| 25 | 7 | 10.24 | 8.60 | 18.84 |
| 25 | 8 | 10.24 | 9.83 | 20.07 |
| 24 | 9 | 9.83 | 11.06 | 20.89 |
| 24 | 10 | 9.83 | 12.29 | 22.12 |
| 24 | 11 | 9.83 | 13.52 | 23.35 |
| 23 | 12 | 9.42 | 14.75 | 24.17 |
| 23 | 13 | 9.42 | 15.97 | 25.40 |
| 22 | 14 | 9.01 | 17.20 | 26.21 |
| 22 | 15 | 9.01 | 18.43 | 27.44 |
| 21 | 16 | 8.60 | 19.66 | 28.26 |
| 21 | 17 | 8.60 | 20.89 | 29.49 |
| 20 | 18 | 8.19 | 22.12 | 30.31 |
| 20 | 19 | 8.19 | 23.35 | 31.54 |
| 19 | 20 | 7.78 | 24.58 | 32.36 |
| 19 | 21 | 7.78 | 25.80 | 33.59 |
| 18 | 22 | 7.37 | 27.03 | 34.41 |
| 18 | 23 | 7.37 | 28.26 | 35.64 |
| 17 | 24 | 6.96 | 29.49 | 36.45 |
| 17 | 25 | 6.96 | 30.72 | 37.68 |
| 16 | 26 | 6.55 | 31.95 | 38.50 |
| 16 | 27 | 6.55 | 33.18 | 39.73 |
| 16 | 28 | 6.55 | 34.41 | 40.96 |
| 15 | 29 | 6.14 | 35.64 | 41.78 |
| 15 | 30 | 6.14 | 36.86 | 43.01 |
| 14 | 31 | 5.73 | 38.09 | 43.83 |
| 14 | 32 | 5.73 | 39.32 | 45.06 |
| 13 | 33 | 5.32 | 40.55 | 45.88 |
| 13 | 34 | 5.32 | 41.78 | 47.10 |
| 12 | 35 | 4.92 | 43.01 | 47.92 |
| 12 | 36 | 4.92 | 44.24 | 49.15 |
| 11 | 37 | 4.51 | 45.47 | 49.97 |
| 11 | 38 | 4.51 | 46.69 | 51.20 |
| 10 | 39 | 4.10 | 47.92 | 52.02 |
| 10 | 40 | 4.10 | 49.15 | 53.25 |
| 9 | 41 | 3.69 | 50.38 | 54.07 |
| 9 | 42 | 3.69 | 51.61 | 55.30 |
| 8 | 43 | 3.28 | 52.84 | 56.12 |
| 8 | 44 | 3.28 | 54.07 | 57.34 |
| 8 | 45 | 3.28 | 55.30 | 58.57 |
| 7 | 46 | 2.87 | 56.52 | 59.39 |
| 7 | 47 | 2.87 | 57.75 | 60.62 |
| 6 | 48 | 2.46 | 58.98 | 61.44 |
| 6 | 49 | 2.46 | 60.21 | 62.67 |
| 5 | 50 | 2.05 | 61.44 | 63.49 |
| 5 | 51 | 2.05 | 62.67 | 64.72 |
| 4 | 52 | 1.64 | 63.90 | 65.54 |
| 4 | 53 | 1.64 | 65.13 | 66.76 |
| 3 | 54 | 1.23 | 66.36 | 67.58 |
| 3 | 55 | 1.23 | 67.58 | 68.81 |
| 2 | 56 | 0.82 | 68.81 | 69.63 |
| 2 | 57 | 0.82 | 70.04 | 70.86 |
| 1 | 58 | 0.41 | 71.27 | 71.68 |
| 1 | 59 | 0.41 | 72.50 | 72.91 |
| 0 | 60 | 0.00 | 73.73 | 73.73 |
| 0 | 61 | 0.00 | 74.96 | 74.96 |
|   | 68 |   | 83.56 | 83.56 |

Figure 7:
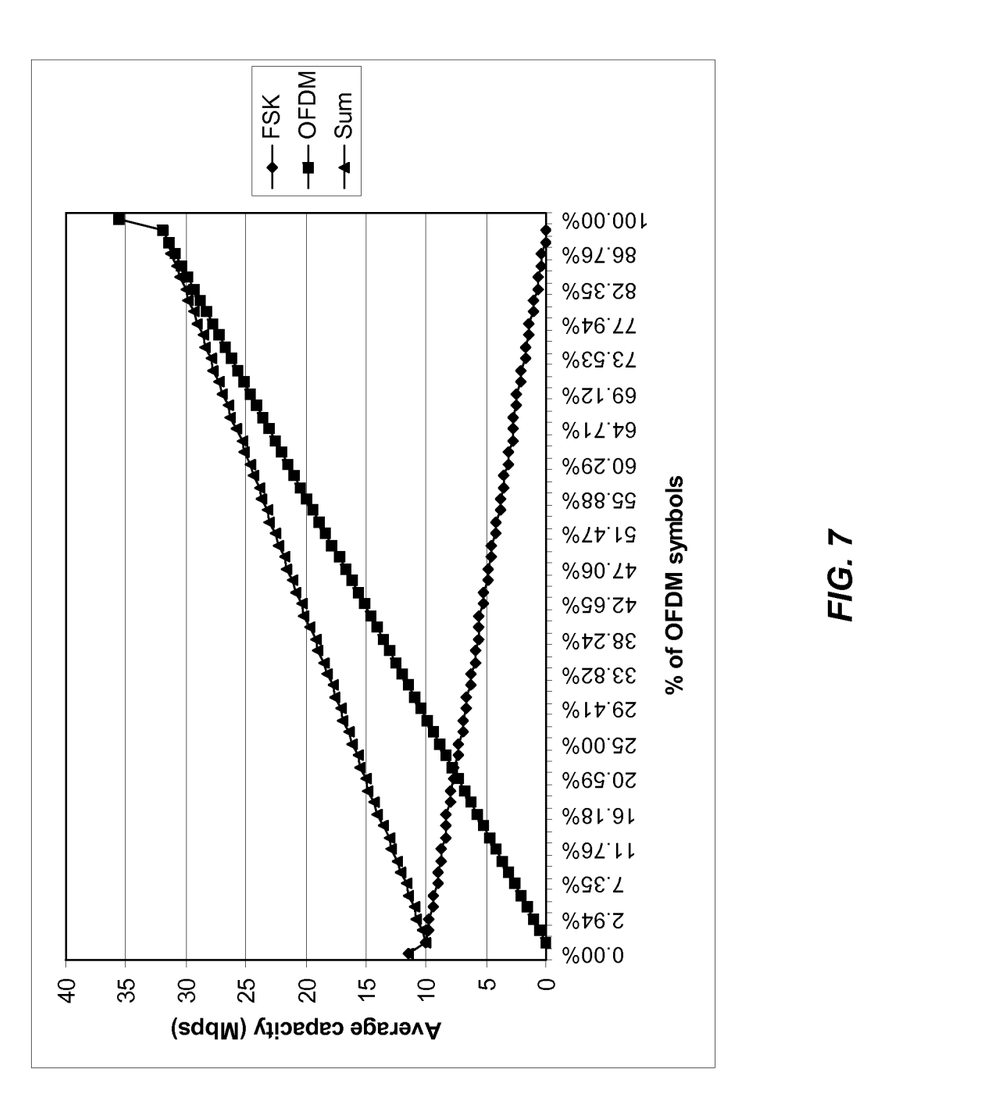
FIG. 7 is a graph representing the calculations of Table 2.

Table 1 assumes that all FSK users transmit at 4 levels and that all OFDM users transmit at 64 QAM MIMO. Table 2 and corresponding FIG. 7 show that same FSK and OFDM throughput when average capacity is considered. The assumption is that users are uniformly distributed across the area. FSK users use either 2 or 4 levels depending on their distance to the AP; OFDM users use QPSK, 16 QAM or 64 QAM modulations depending on their distance to the AP. In a cell with a radius of five miles, the average FSK throughput is 11.48 Mbps, while the average MIMO OFDM throughput is 35.57 Mbps.

TABLE 2

FSK + OFDM average capacity

| Number of symbols | | Throughput (Mbps) | | |
|---|---|---|---|---|
| FSK | OFDM | FSK | OFDM | Sum |
| 33 |   | 11.48 |   | 11.48 |
| 29 | 0 | 10.09 | 0.00 | 10.09 |
| 28 | 1 | 9.74 | 0.52 | 10.26 |
| 28 | 2 | 9.74 | 1.05 | 10.79 |
| 27 | 3 | 9.39 | 1.57 | 10.96 |
| 27 | 4 | 9.39 | 2.09 | 11.49 |
| 26 | 5 | 9.05 | 2.62 | 11.66 |
| 26 | 6 | 9.05 | 3.14 | 12.18 |
| 25 | 7 | 8.70 | 3.66 | 12.36 |
| 25 | 8 | 8.70 | 4.19 | 12.88 |
| 24 | 9 | 8.35 | 4.71 | 13.06 |
| 24 | 10 | 8.35 | 5.23 | 13.58 |
| 24 | 11 | 8.35 | 5.75 | 14.10 |
| 23 | 12 | 8.00 | 6.28 | 14.28 |
| 23 | 13 | 8.00 | 6.80 | 14.80 |
| 22 | 14 | 7.65 | 7.32 | 14.98 |
| 22 | 15 | 7.65 | 7.85 | 15.50 |
| 21 | 16 | 7.31 | 8.37 | 15.68 |
| 21 | 17 | 7.31 | 8.89 | 16.20 |
| 20 | 18 | 6.96 | 9.42 | 16.37 |
| 20 | 19 | 6.96 | 9.94 | 16.90 |
| 19 | 20 | 6.61 | 10.46 | 17.07 |
| 19 | 21 | 6.61 | 10.99 | 17.60 |
| 18 | 22 | 6.26 | 11.51 | 17.77 |
| 18 | 23 | 6.26 | 12.03 | 18.29 |
| 17 | 24 | 5.91 | 12.56 | 18.47 |
| 17 | 25 | 5.91 | 13.08 | 18.99 |
| 16 | 26 | 5.57 | 13.60 | 19.17 |
| 16 | 27 | 5.57 | 14.12 | 19.69 |
| 16 | 28 | 5.57 | 14.65 | 20.21 |
| 15 | 29 | 5.22 | 15.17 | 20.39 |
| 15 | 30 | 5.22 | 15.69 | 20.91 |
| 14 | 31 | 4.87 | 16.22 | 21.09 |
| 14 | 32 | 4.87 | 16.74 | 21.61 |
| 13 | 33 | 4.52 | 17.26 | 21.79 |
| 13 | 34 | 4.52 | 17.79 | 22.31 |
| 12 | 35 | 4.17 | 18.31 | 22.48 |
| 12 | 36 | 4.17 | 18.83 | 23.01 |
| 11 | 37 | 3.83 | 19.36 | 23.18 |
| 11 | 38 | 3.83 | 19.88 | 23.71 |
| 10 | 39 | 3.48 | 20.40 | 23.88 |
| 10 | 40 | 3.48 | 20.93 | 24.40 |
| 9 | 41 | 3.13 | 21.45 | 24.58 |
| 9 | 42 | 3.13 | 21.97 | 25.10 |
| 8 | 43 | 2.78 | 22.50 | 25.28 |
| 8 | 44 | 2.78 | 23.02 | 25.80 |
| 8 | 45 | 2.78 | 23.54 | 26.32 |
| 7 | 46 | 2.44 | 24.06 | 26.50 |
| 7 | 47 | 2.44 | 24.59 | 27.02 |
| 6 | 48 | 2.09 | 25.11 | 27.20 |
| 6 | 49 | 2.09 | 25.63 | 27.72 |
| 5 | 50 | 1.74 | 26.16 | 27.90 |
| 5 | 51 | 1.74 | 26.68 | 28.42 |
| 4 | 52 | 1.39 | 27.20 | 28.59 |
| 4 | 53 | 1.39 | 27.73 | 29.12 |
| 3 | 54 | 1.04 | 28.25 | 29.29 |
| 3 | 55 | 1.04 | 28.77 | 29.82 |
| 2 | 56 | 0.70 | 29.30 | 29.99 |
| 2 | 57 | 0.70 | 29.82 | 30.51 |

TABLE 2-continued

FSK + OFDM average capacity

| Number of symbols | | Throughput (Mbps) | | |
|---|---|---|---|---|
| FSK | OFDM | FSK | OFDM | Sum |
| 1 | 58 | 0.35 | 30.34 | 30.69 |
| 1 | 59 | 0.35 | 30.87 | 31.21 |
| 0 | 60 | 0.00 | 31.39 | 31.39 |
| 0 | 61 | 0.00 | 31.91 | 31.91 |
|   | 68 |      | 35.57 | 35.57 |

Figure 8:
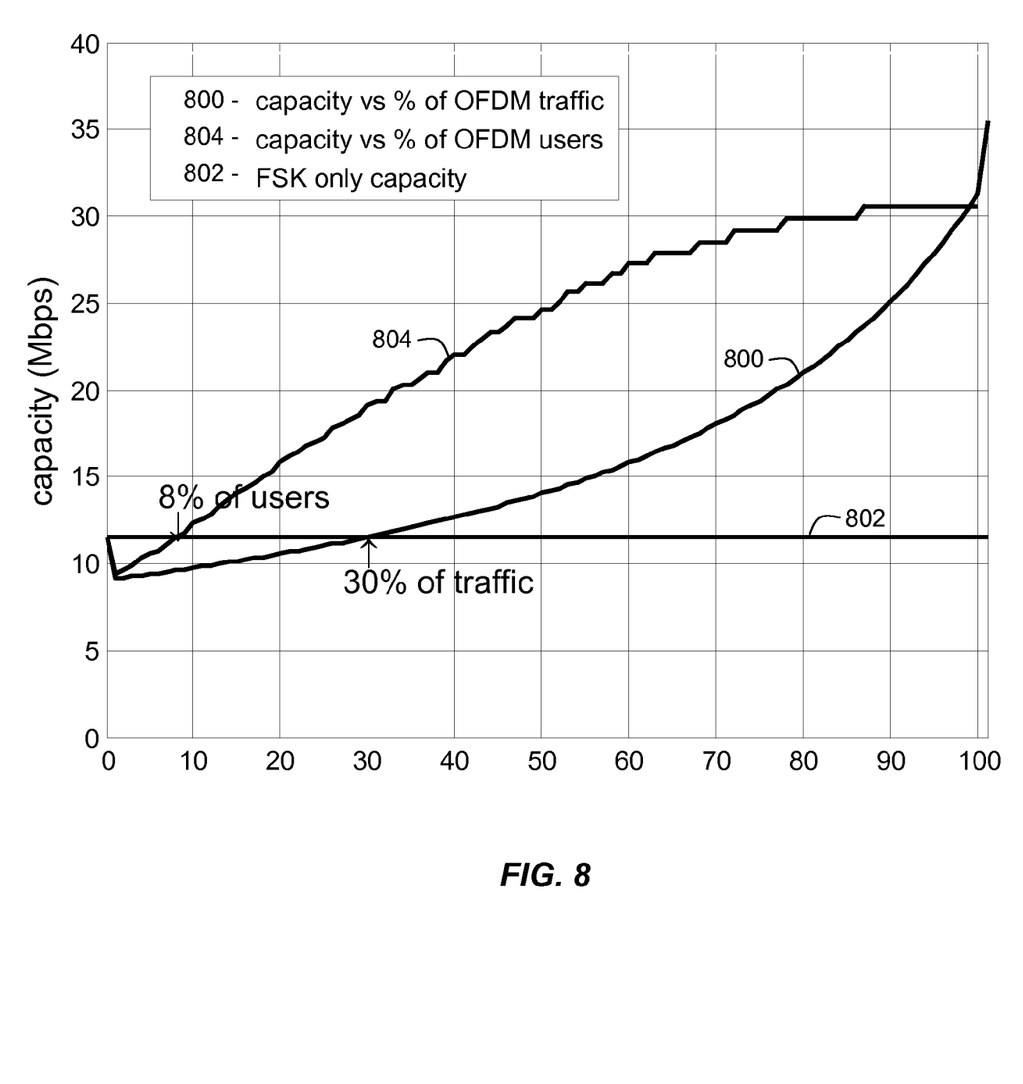
FIG. 8 is a graph representing capacity, in accordance with the present invention.

Line 800 in FIG. 8 shows the average throughput of a sector with the same assumptions as in Table 2 and FIG. 7, but as a function of the OFDM traffic instead of the percentage of OFDM symbols in the frame. Line 802 in FIG. 8 shows the original FSK average capacity before the FSK AP was replaced by the dual mode AP of the present invention. FIG. 8 shows that about 30% of the traffic needs to be moved to the OFDM technology in order to achieve the same original capacity. When more FSK SMs are replaced by OFDM SMs then the overall capacity increases significantly compared to the FSK capacity.

In the assumption that all users generate the same amount of traffic, line 800 in FIG. 8 would also show the average capacity as a function of the percentage of OFDM users. However in a realistic scenario a small percentage of users generate a large percentage of traffic. Data were taken from a sample site in terms of the percentage of traffic generated by the percentage of users, and was incorporated in the capacity calculation to show the average capacity as a function of the percentage of users (line 804 in FIG. 8). Since 30% of the traffic is generated by about 8% of the users, it is sufficient to replace 8% of the FSK SMs to achieve the same original average capacity. Any additional SM that is replaced with an OFDM SM increases the overall capacity as shown in FIG. 8.

Figure 9:
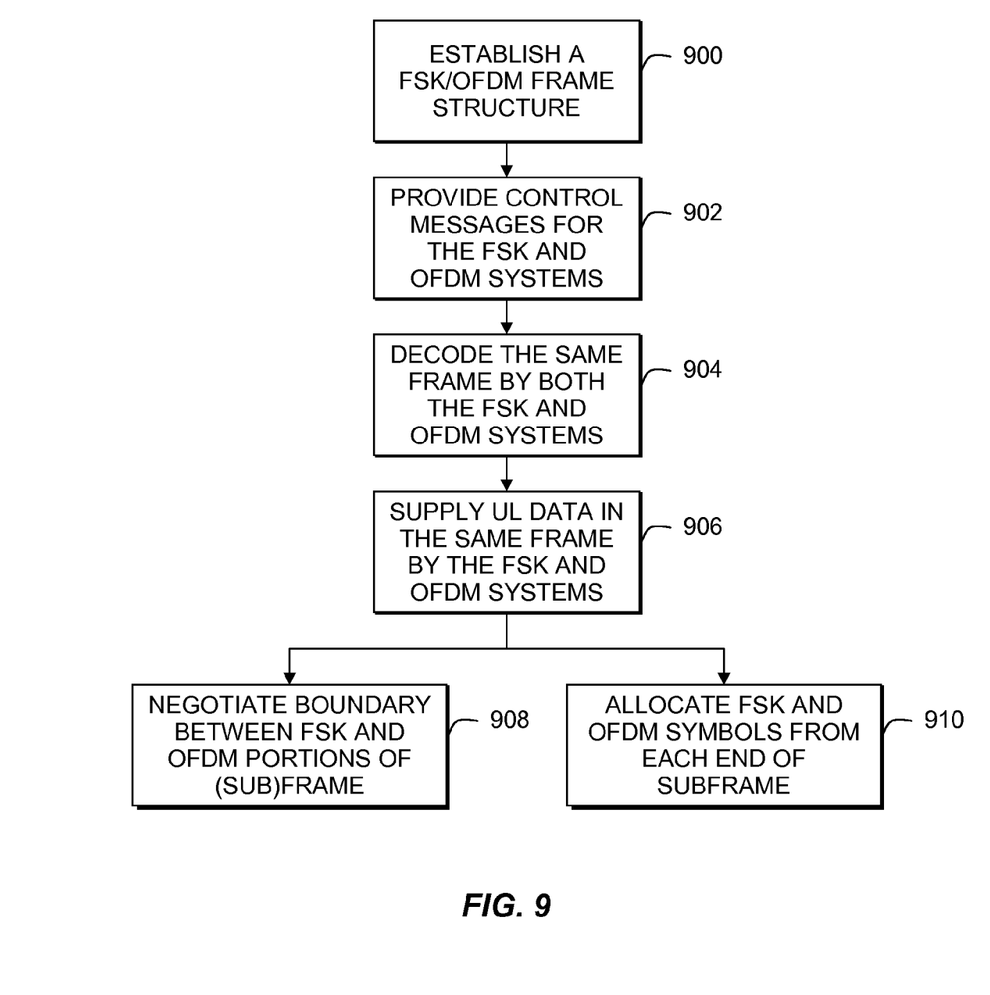
FIG. 9 is a flowchart of a method, in accordance with the present invention.

FIG. 9 illustrates a flowchart of a method to support communication devices with different communication technologies within the same communication channel. One step of the method includes a processor of an access point establishing 900 a common frame structure for the communication channel, the frame having a fixed length and having downlink and uplink portions split between Frequency Shift Keying and Orthogonal Frequency Division Multiplexing technologies, the frame having a defined ratio of FSK to OFDM portions in a downlink subframe and a defined ratio of FSK to OFDM portions in an uplink subframe, which need not be the same. The ratios can change frame by frame to shift boundaries between the OFDM and FSK portions of the UL and DL subframes, dependent on the proportion of OFDM SMs to FSK SMs in the communication channel of the network and on the amount and priority of their traffic.

The frame has a gap (in time) between the FSK DL data and the OFDM DL data such that the time reserved between the beginning of the FSK DL data and the beginning of the OFDM DL data equals an integer number of OFDM symbols. The frame has different control messages of the FSK and OFDM technologies that start at different times in the frame, where each different control message starts at the same relative time and has the same length in every frame. In particular, the beginning of downlink control messages in one technology is at the beginning of the frame structure, while the beginning of downlink control messages in the other technology is shifted with respect to the frame structure, but is the same in every frame.

A next step 902 includes directing a transceiver for providing different control messages for the FSK and OFDM technologies in the frame. This step includes providing information in a beacon of the FSK control messages that indicates a number of DL slots that fill up the entire DL subframe including that portion dedicated to the OFDM DL data, and a beacon that indicates the number of UL symbols to fill up the entire UL subframe including that portion dedicated to the OFDM UL data, wherein the OFDM UL data portion is allocated to a dummy SM in the FSK UL MAP, which the FSK SM will then ignore when supplying uplink data. This step can also include providing information added to a beacon in control messages of the OFDM technology to indicate which downlink symbols need to be decoded by an OFDM SM and which downlink symbols need to be ignored, and providing information in an UL MAP of the OFDM control messages indicating when to transmit OFDM UL data in the UL subframe, where the FSK UL portion is allocated to a dummy SM so the OFDM SMs will not attempt to use it.

Another step includes decoding 904 downlink data in the same frame by an FSK SM and an OFDM SM utilizing information in the control messages. Neither the FSK SMs nor the OFDM SMs need to detect the presence of, nor decode, anything of the other technology. Wherein the FSK SM will attempt to decode the entire DL subframe, but will not be able to decode the OFDM DL data, due to CRC failure, and will therefore ignore the OFDM DL data. The OFDM SM will decode its portion of the DL subframe where indicated by the beacon of the control message.

Another step is supplying 906 UL data in the same frame by an FSK SM and an OFDM SM for the access point processor via the transceiver. The UL MAP of the FSK control messages indicates to each identified FSK SM when to send their FSK UL data, where the OFDM UL data portion is allocated to a dummy SM in the FSK UL MAP, which the FSK SM will then ignore. The UL MAP of the OFDM control messages indicates to each identified OFDM SM when to send their OFDM UL data, where the FSK UL data portion is allocated to a dummy SM in the OFDM UL MAP, which the OFDM SM will then ignore.

Another step includes negotiating 908 the location of the FSK/OFDM boundary between the FSK and OFDM portions in each subframe depending on the traffic parameters. An alternative step is allocating 910 symbols of one technology from the beginning of each subframe, and symbols of the other technology from the end of each subframe until no symbols are left in between, defining a boundary between the portions in that subframe.

Advantageously, the apparatus and method described herein enables the use of the same frame for two different wireless communication technologies, which is useful during the interim of the conversion of the system from one technology to the other. The subscriber modules are not required to be modified to use the system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method to support communication devices with different communication technologies within the same communication channel, the method comprising:
    establishing a common frame structure for the communication channel, the frame having a fixed length and having a downlink subframe and an uplink subframe, each of the downlink and uplink subframes having portions split between different first and second communication technologies;
    determining a location of a boundary between the portions in each subframe depending on the traffic parameters;
    providing different control messages for the respective different technologies in the frame;
    decoding downlink data in a downlink subframe of the frame using the different technologies utilizing information in the control messages; and
    supplying uplink data in an uplink subframe of the frame using the different technologies utilizing information in the control messages.

2. The method of claim 1, wherein establishing includes the frame having a defined ratio of portions in a downlink subframe for each technology and a defined ratio of portions in an uplink subframe for each technology.

3. The method of claim 2 wherein the ratios can change to shift boundaries between the portions of the uplink and downlink subframe of the frame, dependent on the proportion of the different technologies used in the communication channel.

4. The method of claim 1, wherein establishing includes a time gap between the portions of the downlink subframe, such that a first portion of the first technology of the downlink subframe plus the gap equal an integer number of symbols in the second technology.

5. The method of claim 1, wherein the different control messages of the start at different times in the frame, where each different control message starts at the same relative time and has the same length in every frame.

6. The method of claim 5, wherein the beginning of downlink control messages in one technology is at the beginning of the frame structure, while the beginning of downlink control messages in the other technology is shifted with respect to the frame structure, and is the same in every frame.

7. The method of claim 1, further comprising the step of allocating symbols of one technology from the beginning of each subframe, and symbols of the other technology from the end of each subframe until no symbols are left in between, defining a boundary between the portions in that subframe.

8. A method to support communication devices with different communication technologies within the same communication channel, the method comprising:

establishing a common frame structure for the communication channel, the frame having a fixed length and having a downlink subframe and an uplink subframe, each of the downlink and uplink subframes having portions split between different first and second communication technologies;

providing different control messages for the respective different technologies in the frame including information indicating to the first technology a number of downlink slots that fill up the entire downlink subframe including that portion dedicated to the second technology;

decoding downlink data in a downlink subframe of the frame using the different technologies utilizing information in the control messages wherein decoding includes attempting to decode the entire downlink subframe, being unable to decode the data in that portion dedicated to the second technology, and ignoring the undecoded data; and supplying uplink data in an uplink subframe of the frame using the different technologies utilizing information in the control messages.

9. A method to support communication devices with different communication technologies within the same communication channel, the method comprising:

establishing a common frame structure for the communication channel, the frame having a fixed length and having a downlink subframe and an uplink subframe, each of the downlink and uplink subframes having portions split between different first and second communication technologies;

providing different control messages for the respective different technologies in the frame including information indicating to a subscriber module using the first technology a number of uplink symbols that fill up the entire uplink subframe including that portion dedicated to the second technology;

allocating that portion dedicated to the second technology to a dummy subscriber module such that supplying includes ignoring that portion dedicated to the second technology;

decoding downlink data in a downlink subframe of the frame using the different technologies utilizing information in the control messages; and supplying uplink data in an uplink subframe of the frame using the different technologies utilizing information in the control messages.

10. A method to support communication devices with different communication technologies within the same communication channel, the method comprising:

establishing a common frame structure for the communication channel, the frame having a fixed length and having a downlink subframe and an uplink subframe, each of the downlink and uplink subframes having portions split between different first and second communication technologies;

providing different control messages for the respective different technologies in the frame including indicating to a subscriber module using the second technology which downlink symbols need to be decoded in the downlink subframe and which downlink symbols need to be ignored;

decoding downlink data including the indicated downlink symbols in a downlink subframe of the frame using the different technologies utilizing information in the control messages; and supplying uplink data in an uplink subframe of the frame using the different technologies utilizing information in the control messages.

11. A method to support communication devices with different communication technologies within the same communication channel, the method comprising:

establishing a common frame structure for the communication channel, the frame having a fixed length and having a downlink subframe and an uplink subframe, each of the downlink and uplink subframes having portions split between different first and second communication technologies;

providing different control messages for the respective different technologies in the frame including information indicating to a subscriber module using the second technology when to supply uplink symbols in the uplink subframe, allocating that portion of the uplink subframe dedicated to the first technology to a dummy subscriber module;

decoding downlink data in a downlink subframe of the frame using the different technologies utilizing information in the control messages; and supplying uplink data in an uplink subframe of the frame using the different technologies utilizing information in the control messages ignoring that portion dedicated to the first technology.

12. A method to support communication devices with different communication technologies within the same communication channel, the method comprising:

establishing a common frame structure for the communication channel, the frame having a fixed length and having a downlink subframe and an uplink subframe, each of the downlink and uplink subframes having portions split between different first and second communication technologies;

providing different control messages for the respective different technologies in the frame;

decoding downlink data in a downlink subframe of the frame using the different technologies utilizing information in the control messages; and supplying uplink data in an uplink subframe of the frame using the different technologies utilizing information in the control messages, wherein a subscriber module using one of the technologies need not detect the presence of, nor decode anything of, the other technology.

13. The method of claim 12, further comprising the step of negotiating a location of a boundary between the portions in each subframe depending on the traffic parameters.

14. An access point for support communication devices with different communication technologies within the same communication channel, the access point comprising:

a transceiver; and at least one processor configured to establish a common frame structure for the communication channel, the frame having a fixed length and a downlink subframe and an uplink subframe, each of the downlink and uplink subframes having portions split between different first and second communication technologies, negotiate a location of a boundary between the portions in each subframe depending on the traffic parameters, provide different control messages for the respective different technologies in the frame, direct the transceiver to provide downlink data for decoding in a downlink subframe of the frame using the different technologies utilizing information in the control messages, and receive supplied uplink data via the transceiver in an uplink subframe of the frame using the different technologies utilizing information in the control messages.

15. The access point of claim 14, further comprising two schedulers, one for each technology, operable to negotiate the location of the boundary between the portions in each subframe depending on the traffic parameters.

16. The access point of claim 14, further comprising a scheduler, operable to allocating symbols of one technology from the beginning of each subframe, and symbols of the other technology from the end of each subframe until no symbols are left in between, defining a boundary between the portions in that subframe.

17. A system for support communication devices with different communication technologies within the same communication channel, the system comprising:
- two subscriber modules; and
- an access point operable to
- establish a common frame structure for the communication channel, the frame having a fixed length and having a downlink subframe and an uplink subframe, each of the downlink and uplink subframes having portions split between different first and second communication technologies,
- negotiate a location of a boundary between the portions in each subframe depending on the traffic parameters,
- provide different control messages for the respective different technologies in the frame to the subscriber modules, and
- provide downlink data for decoding in a downlink subframe of the frame using the different technologies utilizing information in the control messages to the subscriber modules,
- wherein the subscriber modules are operable to decode the downlink data in the downlink subframe of the frame using the different technologies utilizing information in the control messages, and supply uplink data in an uplink subframe of the frame using the different technologies utilizing information in the control messages.

* * * * *